(12) United States Patent
Phillips (10) Patent No.: US 10,590,801 B2
(45) Date of Patent: Mar. 17, 2020

(54) SEAL PANEL FOR A GAS TURBINE ENGINE

(71) Applicant: ROLLS-ROYCE plc, London (GB)

(72) Inventor: Iain David Martin Phillips, Derby (GB)

(73) Assignee: ROLLS-ROYCE plc, London (GB)

( * ) Notice: Subject to any disclaimer, the term of this patent is extended or adjusted under 35 U.S.C. 154(b) by 325 days.

(21) Appl. No.: 15/915,551

(22) Filed: Mar. 8, 2018

(65) Prior Publication Data
US 2018/0266276 A1    Sep. 20, 2018

(30) Foreign Application Priority Data
Mar. 14, 2017 (GB) .................... 1704045.2

(51) Int. Cl.
*F01D 25/16*    (2006.01)
*F01D 21/08*    (2006.01)
(Continued)

(52) U.S. Cl.
CPC ......... *F01D 25/164* (2013.01); *F01D 21/045* (2013.01); *F01D 21/08* (2013.01);
(Continued)

(58) Field of Classification Search
CPC ........ F01D 25/164; F01D 25/16; F01D 25/28; F01D 25/24; F01D 21/045; F01D 21/08; F02C 7/06; F02C 7/28; F05D 2220/32; F05D 2240/50; F05D 2240/55; F05D 2260/311; F16C 2360/23; Y02T 50/672
See application file for complete search history.

(56) References Cited

U.S. PATENT DOCUMENTS 3,901,557 A * 8/1975 Daniels ................. F01D 21/045
                                                                384/447
4,406,460 A   9/1983 Slayton
(Continued)

FOREIGN PATENT DOCUMENTS

GB         371110        6/1961
GB        1293811       10/1972
(Continued)

OTHER PUBLICATIONS

Great Britain Search Report dated Sep. 1, 2017 issued in GB Patent Application No. 1704045.2.

*Primary Examiner* — Richard A Edgar
*Assistant Examiner* — Joshua R Beebe
(74) *Attorney, Agent, or Firm* — Simpson & Simpson, PLLC (57) ABSTRACT

Described is a shaft support system for a gas turbine engine comprising: a rotatable fan shaft; first and second support structures extending in parallel from the shaft to a load bearing structure to provide radial location of the shaft within an engine casing, wherein the first support and second support structures include first and second respective mechanical fusible joints; wherein the first fusible joint is a two-stage fuse which partially fails within a first predetermined load range, the second fusible joint fails within a second predetermined load range which is different to the first load range, and the first fusible joint fully fails only when the second fusible joint has failed.

13 Claims, 2 Drawing Sheets

(51) Int. Cl.
*F01D 25/28* (2006.01)
*F01D 25/24* (2006.01)
*F01D 21/04* (2006.01)
*F02C 7/06* (2006.01)
*F02C 7/28* (2006.01)

(52) U.S. Cl.
CPC ............ *F01D 25/16* (2013.01); *F01D 25/24* (2013.01); *F01D 25/28* (2013.01); *F02C 7/06* (2013.01); *F02C 7/28* (2013.01); *F05D 2220/32* (2013.01); *F05D 2240/50* (2013.01); *F05D 2240/55* (2013.01); *F05D 2260/311* (2013.01); *F16C 2360/23* (2013.01); *Y02T 50/672* (2013.01)

(56) References Cited

U.S. PATENT DOCUMENTS

| | | | | |
|---|---|---|---|---|
| 4,475,869 A | * | 10/1984 | Davies | F01D 5/027 384/425 |
| 5,791,789 A | * | 8/1998 | Van Duyn | F01D 21/045 384/624 |
| 6,073,439 A | * | 6/2000 | Beaven | F01D 21/045 415/9 |
| 6,079,200 A | * | 6/2000 | Tubbs | F01D 21/045 415/9 |
| 6,447,248 B1 | * | 9/2002 | Kastl | F01D 21/045 384/535 |
| 8,167,531 B2 | * | 5/2012 | Mollmann | F01D 21/045 415/1 |
| 2004/0006967 A1 | * | 1/2004 | Clark | F01D 21/04 60/223 |
| 2006/0269391 A1 | | 11/2006 | Stephenson et al. | |
| 2009/0246018 A1 | * | 10/2009 | Kondo | F01D 25/164 415/229 |
| 2013/0272871 A1 | * | 10/2013 | Webster | F01D 21/045 415/229 |

FOREIGN PATENT DOCUMENTS

| | | |
|---|---|---|
| GB | 1421377 | 1/1976 |
| GB | 2323637 | 9/1998 |
| GB | 2444935 | 6/2008 |
| GB | 2461778 | 1/2010 |
| WO | 2014004491 | 1/2014 |
| WO | 2014152300 | 9/2014 |
| WO | WO-2015075355 A1 * | 5/2015 |
| WO | WO-2015160635 A1 * | 10/2015 |

* cited by examiner

SEAL PANEL FOR A GAS TURBINE ENGINE

CROSS-REFERENCE TO RELATED APPLICATIONS

This specification is based upon and claims the benefit of priority from UK Patent Application Number 1704045.2 filed on 14 Mar. 2017, the entire contents of which are incorporated herein by reference.

TECHNICAL FIELD OF DISCLOSURE

The present disclosure relates to a seal panel for a gas turbine engine. The seal panel provides a seal between a propulsive fan and a forward bearing chamber of the gas turbine engine.

BACKGROUND OF DISCLOSURE

Figure 1:
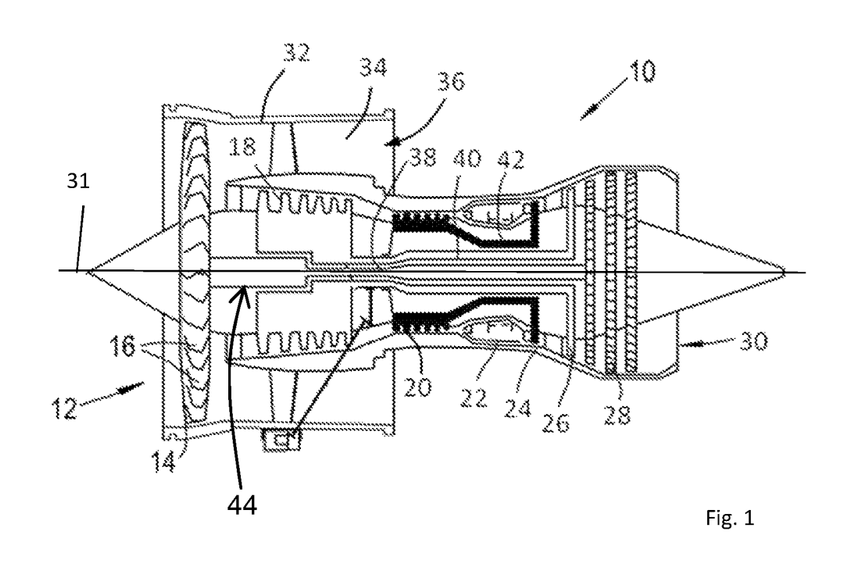
FIG. 1 shows a longitudinal cross-section of a conventional gas turbine engine.

FIG. 1 shows a ducted fan gas turbine engine 10 comprising in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36. The engine has a principal axis of rotation 31.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by concentric interconnecting shafts 38, 40, 42.

In operation the different turbine stages are loaded rearwards. This loading is at least partially offset by the respective compressor which is loaded forwards, with the net rearward force being taken up by various supports structures via the bearings. However, in some instances, the net rearward force may load the bearings to an undesirable level causing premature wear and potential lifting issues.

In the past, existing arrangements have provided a seal panel which acts as a pneumatic piston which is used to provide a forward loading on the fan to offset the rearward loading on the turbine. GB2323637, GB2444935 and GB2461778 all show these sorts of arrangements.

Referring to the applicant's own previously published application GB2323637, although not described in the document, the carrier 44 and seal 42 provide a sealed chamber which can be pressurised with air from a compressor. This air is at a higher pressure than the ambient air which surrounds the fan hub on the upstream side of the seal panel. Thus, in use, the relatively high pressure air provides a forward load or bias on the seal panel once the compressor which supplies the high speed air is up to speed. The level of forward loading increases with the compressor speed which is matched to the turbine speed and relates to the rearward loading on the turbine. Thus, the harder and faster the turbine is driven, the greater the rearward force, but the greater the compressor speed and air pressure provided to the seal panel.

The radial location of the seal is determined in part by the amount of forward loading required from the seal panel. The greater the radial distance of the seal from the principal axis of the engine, the greater the area of the seal panel and the greater the forward loading of a given pressure of air. In the example shown, the level of forward loading is significant and so the radial location is towards the casing. Placing the seal at such a radial extent requires a large seal due to the resultant circumferential length. When using a large conventional seal this inevitably comes with a weight penalty.

The present disclosure seeks to provide an improved seal panel.

SUMMARY OF DISCLOSURE

The present disclosure provides a gas turbine engine according to the appended claims.

The present disclosure includes a gas turbine engine comprising: a fan; a fan drive shaft driveably connected to the fan; a bearing chamber located axially aft of the fan and including a bearing for rotational support of the fan drive shaft; a seal panel located axially between the fan and the bearing chamber, the seal panel extending between the fan drive shaft and a static structure and comprising a rotor portion and a stator portion; the rotor portion comprising a cantilever having an attached end attached to the fan drive shaft, and a free end; a seal partitioning the rotor portion and stator portion of the seal panel, the seal having respective rotating parts and a stationary parts and wherein the rotating part of the seal is mounted to the free end of the rotor portion cantilever.

Providing a seal panel which a rotor portion and a stator portion in which the rotor portion is a cantilever, allows the seal to be placed closer to the rotor and the size of the seal made smaller, thereby providing a significant weight saving.

In use, the seal panel may provide a pneumatic piston which is forward biased with pressurised air to offset the rearwards loading on the shaft which is typically carried by the thrust bearing.

The fan drive shaft may be the low pressure turbine shaft. The fan drive shaft may connect directly to the low pressure turbine and low pressure compressor. The cantilever may be a flange. The flange may be attached directly or indirectly to the fan drive shaft. The seal panel may comprise a wall which provides one side of an air chamber. The seal panel may combine with the bearing chamber to provide the air chamber. The static structure may be the bearing chamber, a supporting wall of the bearing chamber, or an engine casing. The stator portion may be a seal carrying stator portion. The rotor portion may be a seal carrying rotor portion. The seal may be a two part seal having a rotational part and a static part. The seal may be a labyrinth seal.

The stator portion of the seal panel may comprise a cantilevered wall extending from an attached end which is attached to a static structure and a free end to which the stationary part of the seal is mounted. The seal panel may be attached to the bearing chamber.

The gas turbine engine may further comprise a second seal panel extending between bearing chamber and the engine casing. The seal panel and the second seal panel may be attached to the bearing chamber at a common node.

The seal panel may form part of a first chamber. The first chamber may be pressurised. The pressurisation in the first chamber may be sufficient to provide a pneumatic action against the rotor portion to bias the rotor portion of the seal panel and rotor upstream. The seal panel may form part of the first chamber with the one or more walls of the bearing chamber.

The second seal panel may from part of a second chamber. The first and second chambers may be fluidically connected.

The second chamber may be pressurised. The fluidic connection between the first and second chambers may be provided by one or more channels linking the first and second sealed chambers. The fluidic connection allows air to be supplied to the first sealed chamber from the second sealed chamber. The second sealed chamber may be provided with compressed air from a compressor stage of the gas turbine engine. The first chamber and second chamber may be pressurised by a common source.

The second seal panel may form the second chamber with one or more walls of the bearing chamber. The first chamber may be an annular chamber having the rotor located therein. The second chamber may be partially formed by a wall of the static structure. There may not be a second seal panel. The second seal panel may not form part of a chamber. The pressurised air may be delivered to the first chamber via a conduit or other air passageway.

The rotor portion cantilever may lie in a radial plane normal to the rotational axis of the fan drive shaft.

The stator portion cantilever may include a conical portion. The conical portion may extend from a first outer diameter axially forwards to a second inner diameter.

The bearing chamber may include a fused joint which is configured to severe under a first predetermined radial load.

Either or both of the rotor portion or stator portion of the seal panel may include a joint configured to severe upon a second predetermined radial load.

The first predetermined radial load of the bearing chamber fused joint may be greater than the second predetermined load of the seal panel joint.

The second seal panel may include a load reduction portion which is provided to allow the seal panel to deform under a predetermined radial load.

The second seal panel may be a disc-like structure and the load reduction portion is offset so as to be out-of-plane of the disc-like structure. The load reduction portion may include an out-of-plane curve, bulge or meander of the wall section. The second seal panel may be located in two parallel planes. The undulation may bridge the two parallel planes. The two planes may be normal to the rotational axis of the fan drive shaft.

The stator portion may further comprise an annular seal plate having an axially extending part with a radially inwards facing seal surface which sealably opposes the rotating seal part.

The static seal portion may comprise an attachment end which attaches to the static part and provides structural support for the static seal plate. The attachment end may be a flange which extends radially outwards from a radially outer surface of the seal plate. The attachment end may connect to a conical section or a radial portion of the static portion. The attachment end may be located at an axial end of the seal plate.

A stiffening member may be included on the seal plate to reduce bending of the seal ring and to concentrate the load in to the failing bolts. The stiffening member may be on the radial outer of the seal ring and may be provided by a flange which extends radially away from the seal plate. The flange may be located towards an axial end of the seal plate. The axial end may be the axial end which is opposite to the attachment end. The radial (or transverse) section of the annular stator portion seal may be substantially u-shaped with one side of the u-shape providing the stiffening member, and the other side of the u-shaped member providing the attachment end.

The seal plate may be an annular ring in the form of a circumferential band having axial length. The seal plate may have a constant radius along the axial extent of the seal face. The axial extent may allow stator portion and rotor portion of the seal to move axially relative to one another. The seal plate may form one part of the labyrinth seal.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF DRAWINGS

Embodiments of the disclosure will now be described with the aid of the following drawings of which.

DETAILED DESCRIPTION OF THE DISCLOSURE

Unless otherwise stated, in the following description the terms axial and radial will generally have reference to the principal axis of rotation, which in the described in disclosure is the principal axis of the engine. Terms such as upstream and downstream, fore and aft, are used in view of the general direction of air flow through the engine from fan at the front, the nozzle at the rear.

Figure 2:
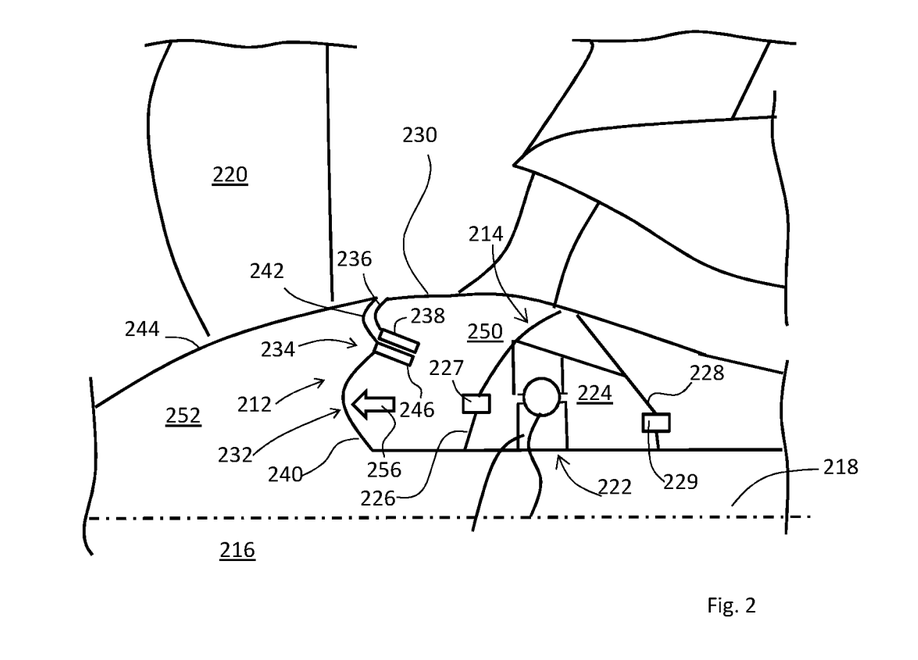
FIG. 2 shows a schematic partial cross-section of a front bearing chamber support structure.

FIG. 2 shows a schematic partial longitudinal section of a gas turbine engine having a seal panel 212, a shaft support system 214 by which a shaft 216 is axially and rotatably retained on the central or principal axis of rotation 218 of the engine, and a fan 220.

The shaft is retained on the principal axis of the engine in normal use in part by a bearing arrangement 222 which, in the described example, is a thrust bearing providing axial and radial restraint of the shaft and fan assembly. The bearing arrangement 222 is located within a bearing chamber 224 having fore 226 and aft 228 bearing chamber walls. The bearing chamber walls each include seals 227, 229 to partition the walls and allow for the relative rotation of the shaft 216 within the engine casing 230. Thus, a portion of each bearing chamber wall has a radially inner rotating part, and a radially outer stationary part.

The stationary parts of the bearing chamber walls are indirectly attached to the engine casing 230 which provides the necessary support to retain the shaft on the principal rotational axis during use. It will be appreciated that the shaft will have at least one further bearing along its length to provide the necessary support along the axis.

The interior of the bearing chamber 224 is a wet environment enclosing a lubricant for lubricating the bearing in use. The lubricant is typically oil which is introduced into and around the bearing surfaces as is well known in the art.

The seal panel 212 includes a rotor carrier 232, a seal 234 and a stator carrier 236. The stator carrier 236 extends from the engine casing 230 and is stationary in relation to the rotor comprising the shaft 216 and fan 220. The radially inner, terminal end of the stator carrier has a first and stationary part 238 of a two part seal attached to it. The two part seal may be any suitable seal as known in the art, such as, for example, a labyrinth or fin seal. It will be appreciated that the two parts of the two part seal relate to a first stationary part and a second rotating part, and each part may include multiple components in themselves.

The rotor carrier 232 rotates with the fan 220 and shaft 216 and may include a radially inner portion 240 and a radially outer portion 242 which between them may provide a continuous structure from the shaft to the nose cone faring 244 which forms part of the fan assembly 220.

The rotor carrier 232 includes the rotating second part 246 of the two part seal which is located adjacent to the stator carrier seal portion to provide an air seal therebetween.

The fan assembly 220 is the foremost rotating component of the engine and includes the propulsive fan which includes a plurality of circumferentially distributed radially extending fan blades attached to a hub. The hub includes a cone shaped faring and a root assembly which attaches the fan blades to the shaft. Fan root assemblies are well known in the art and thus not shown in FIG. 2.

The shaft 216 is the low pressure shaft which is driveably connected to the low pressure turbine described in relation to FIG. 1. It will be appreciated that the described engine is a direct drive in which the shaft extends continuously between the turbine and fan and in which the fan rotates at the same speed as the low pressure turbine. However, the gas turbine engine may incorporate a gear train to reduce the speed of the fan relative to the turbine as is known in the art.

The seal panel 212 is located aft of the fan assembly 220 and fore of the bearing chamber 224 and provides a piston chamber 250 or buffer therebetween. The piston chamber 250 is supplied with pressurised air in use which acts on the part of the rotor carrier which is radially inwards of the seal 234 to provide a forward axial force on the fan and low pressure shaft. Hence, in use, the fan assembly and area 252 within the fan cone faring 244 is open to ambient pressure by virtue of one or more apertures or vents which fluidically connect the internal area to the external surrounding air intake. The piston chamber 250 formed between the seal panel and the bearing chamber 224 is provided with compressed air from a suitable compressor stage.

The pneumatic pressure in the piston chamber 250 is higher than the internal pressure of the bearing chamber 224. The high pressure air within the piston chamber 252 loads the radially inner portion of the rotor carrier 240 so as to bias it forwards such that the seal panel wall 212 acts as a pneumatic piston as indicated by arrow 256. The forward loading reacts through the rotor carrier wall 232 and into the shaft thereby offsetting the net axial load caused by the rearward force on the turbine. Thus, the net axial load on the thrust bearing is reduced and its service life potentially prolonged.

Figure 3:
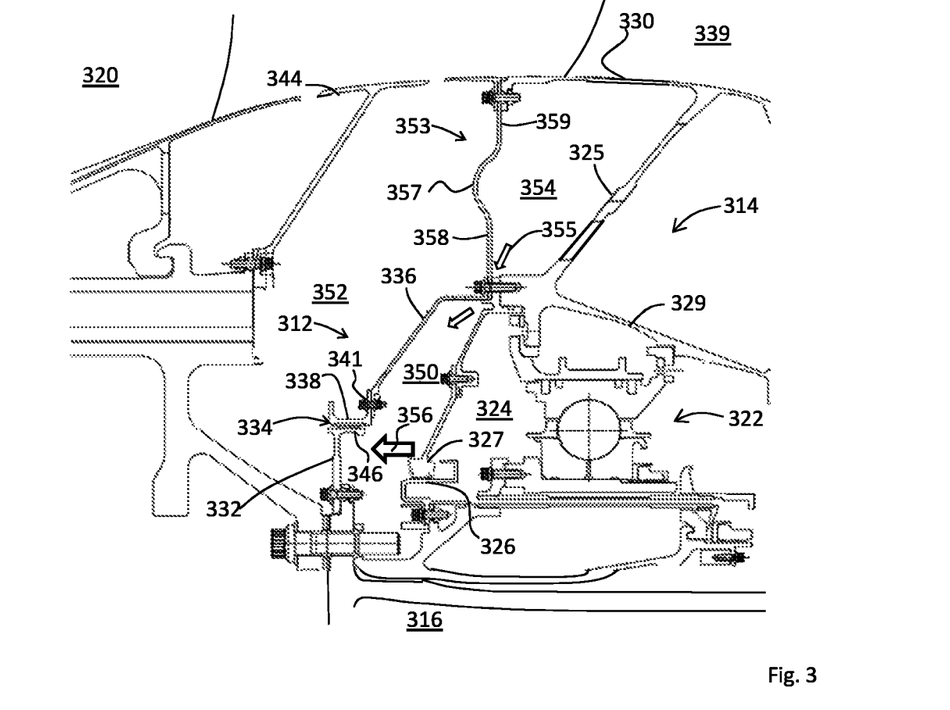
FIG. 3 shows a partial longitudinal section of a fan and front bearing chamber of a gas turbine engine incorporating a seal panel and a second seal panel.

FIG. 3 shows an arrangement with an alternative seal panel 312. Hence, there is shown a portion of a gas turbine engine which is generally similar to the one shown in FIG. 1. The gas turbine engine comprises: a fan 320; a fan drive shaft 316 driveably connected to the fan 320; a bearing chamber 324 located axially aft of the fan 320 and including a bearing 322 for rotational support of the fan drive shaft 316; a seal panel 312 located axially between the fan 320 and the bearing chamber 324, the seal panel 312 extending between the fan drive shaft 316 and a static structure 324, 330 and comprising a rotor portion 332 and a stator portion 336; the rotor portion 332 comprising a cantilever in the form of a flange having an attached end attached to the fan drive shaft 316, and a free end; a seal 334 partitioning the rotor portion 332 and stator portion 336 of the seal panel 312, the seal 334 having a respective rotating part 346 and a stationary part 338 and wherein the rotating part 346 of the seal 334 is mounted to the free end of the rotor portion cantilever 332.

The fan 320 is the foremost rotating component of the engine and provides the predominant portion of the engine's thrust via the bypass duct described in relation to FIG. 1. The fan 320 includes a plurality of circumferentially distributed radially extending fan blades (which are only partially visible) attached to a hub. The hub includes a cone shaped faring 344 and a root assembly which attaches the fan blades to the shaft 316.

The fan drive shaft 316 may be any which is driveably connected to the fan hub and may include a direct drive which links the low pressure turbine direct to the fan 320, or may be the output from a gear train. It will be appreciated that the fan, fan hub and fan drive shaft rotate as one during use and are powered by the respective low pressure turbine.

The fan drive shaft 316 lies along and has an axis of rotation which defines (or is at least coaxial with) the principal axis of the engine and low pressure turbine. The fan drive shaft 316 is retained on its rotational axis during normal use at least in part by a bearing arrangement 322.

The bearing arrangement 322 is located within a bearing chamber 324 having fore 326 and aft bearing chamber walls and is described in more detail below in relation to FIG. 4.

Staying with FIG. 3, the seal panel 312 is located axially between the fan 320 and the bearing chamber 324 and extends between the fan drive shaft 316 and a static structure such as the bearing chamber 324, the bearing chamber support wall 325, or the engine casing 330, or any combination of these. The seal panel includes a rotor portion in the form or rotor carrier 332, a seal 334 and a stator portion in the form of a stator carrier 336.

The stator carrier 336 may be a cantilevered wall which extends from the engine casing 330 or from the bearing chamber or bearing chamber support wall as shown in FIG. 3. The stator carrier 336 is attached to one or more of these static structures so as to be stationary in relation to the fan rotor or low pressure spool which includes the fan drive shaft 316 and fan 320.

The stator carrier 336 is in the form of a cantilevered wall having an attached end and a free end. The attached end is radially outwards of the seal 334; the free end proximal to the seal and radially inwards of the attached end. The radially inner, free/terminal end of the stator carrier 336 has a first and stationary part 338 of a two part seal attached to it. The two part seal may be any suitable seal as known in the art, such as, for example, a labyrinth seal. It will be appreciated that the two parts relate to a first stationary part and a second rotating part and each part may include multiple parts in themselves.

The stator carrier 336 comprises a wall which may include a either or both of a conical portion and a cylindrical portion as shown in FIG. 3. The conical portion and cylindrical portion may allow the seal to be located at a desired axial and radial position. In the example shown, the cylindrical portion extends axially forwards from the attached end and terminates in the conical section which extends axially further forwards from the cylindrical wall portion and radially inwards. The distal end of the conical portion terminates in a short radial section which in turn joins to the static portion of the two part seal.

The cylindrical and conical portions provide an axial offset in the static carrier allowing the seal to be moved fore of the bearing chamber. This provides space into which the bearing chamber can collapse when the bearing chamber fused joints (described below) are fully activated. Thus, there is provided a chamber to prevent secondary contact of the bearing chamber wall which could delay subsequent failure times. Hence, in view of FIG. 4, wall portion 331 is free to move radially outwards when joints 333 and 366 have severed.

The seal comprises a static portion 338 and a rotating portion 346. The static portion includes an annular seal ring providing an axially extending seal plate with a radially inwards facing seal surface which sealably opposes the rotating seal part. The static seal portion 338 is comprises an attachment end which attaches to the static part 336 and provides structural support for the static seal plate. The attachment end may be in the form of a flange which extends radially outwards from the seal plate. The attachment end may connect to the conical section or the radial portion described above. The attachment end may be located at an axial end of the seal plate.

A stiffening member may be included on the seal plate to reduce bending of the seal ring and to concentrate the load in to the failing bolts. The stiffening member may be on the radial outer of the seal ring and may be provided by a flange which extends radially away from the seal plate. The flange may be located towards an axial end of the seal plate. The axial end may be the axial end which is opposite to the attachment end. The radial (or transverse) section of the annular stator portion seal may be substantially u-shaped with one side of the u-shape providing the stiffening member, and the other side of the u-shaped member providing the attachment end.

The seal plate may be an annular ring in the form of a circumferential band having axial length. The seal plate may have a constant radius along the axial extent of the seal face. The axial extent may allow stator portion and rotor portion of the seal to move axially relative to one another. The attachment end and stiffening flanges may be radially extending flanges or some other member having an alternative section. For example, stator portion of the seal may be provided by a box section in which the seal plate may be one side of a box section. The attachment end may be provided towards one axial end of the seal box section. Alternatively, the stiffening member may be a box section or have one or more walls with reinforcing members extending therebetween.

The seal panel may be relatively easy to collapse in the radial direction so that it does not form any significant part in radially supporting the shaft or related structures. To do this, the load carrying capacity of the panel and or joints are selected to be lower than the bearing chamber walls and less than the breakdown values of the associated fused joints. The skilled person will appreciate that the load carrying capacity of the seal panel in the radial direction may be lowered with the material chose and dimensions of the various parts. For example, the number and size of the bolts may be chosen so that they shear at a predetermined load which is less than the predetermined load of other structural supports or fused joints.

The joint 341 comprises a bolt which clamps a first component in the form of the radially inner stator wall, to a second component in the form of the radially outer stator wall. The bolt is received within a threaded aperture or nut of the second component having passed through an aperture in the first component. Tightening the bolt results in the two panels being clamped together.

In addition to the bolted union in the seal panel joint, the connection may include a plurality of pins arranged around the circumferential interface to provide radial and circumferential location. The pins may be fewer in number than the bolts. In the described embodiment, there are just three but more could be used if desired. The number of pins may be advantageous, for example to improve the radial location, but the greater the number the greater the load to severe them and a removal of the load from the fused connections.

Thus, in the example of FIG. 3, there is shown a joint between a radially outer wall portion and a radially inner wall portion of the stator carrier 336. The joint is provided by a bolted interface in which the outer portion includes a plurality of circumferentially distributed bolt receiving apertures through which a bolt passes.

The rotor carrier 332 rotates with the fan 320 and fan drive shaft 316. In the example of FIG. 3, the rotor carrier 332 is in the form of a cantilevered flange having an attached end and a free end. The flange extends from the attached end which is joined to fan drive shaft, either directly or indirectly via or an appendage thereof such as a stub shaft, towards the free end. The free end of the rotor carrier carriers the second or rotating part of the two part seal. The rotor carrier flange may lie in a plane which is normal to the rotational axis of the fan drive shaft as shown.

The seal panel 312 is located aft of the fan assembly 320 and fore of the bearing chamber 324 and provides a sealed chamber, a so-called piston chamber 350, or buffer therebetween. The piston chamber 350 is supplied with pressurised air in use which acts on the seal panel to provide a forward axial force on the fan 320 and low pressure shaft 316.

In use, the fan assembly and area 352 within the fan cone faring 344 is open to ambient pressure by virtue of one or more apertures or vents which fluidly connect the internal area to the external surrounding air intake. The piston chamber 350 formed between the seal panel 312 and the bearing chamber supporting wall is provided with compressed air from a suitable compressor stage. The bearing chamber 324 is supplied with oil under pressure.

The pressure in the piston chamber 350 is higher than that of the bearing chamber 324 to provide a positive pressure in order to prevent oil escape therefrom.

The high pressure air within the piston chamber loads the radially inner portion of the rotor carrier so as to bias it forwards such that the rotor carrier wall 332 acts as a pneumatic piston as indicated by arrow 356. The forward loading reacts through the rotor carrier wall 332 and into the shaft 316 thereby offsetting the net axial load caused by the loading. Thus, the net axial load on the thrust bearing is reduced.

A second seal panel 353 is provided in the arrangement which extends between two fixed ends and provides a wall to compartmentalise the area 354 which is radially outside of the bearing chamber 324. This provides an air chamber which is pressurised to a level higher than ambient pressure. The air may be used to provide air to the piston chamber 350 as indicated by the arrows 355, and additionally or alternatively used elsewhere.

The second sealing panel 353 is substantially disc-like and lies in a plane approximately normal to the axis of rotation, although this is may not be the case in some examples. The second sealing panel may extend from the bearing chamber 324 or bearing chamber support wall 325 to the engine casing 330. In another example, the second sealing panel 353 may extend from the terminal end of static carrier 336. Further, the second sealing panel may be an extension of the static carrier, such that they are provided by the same part and/or comprise a common wall and continuous wall.

The second seal panel attaches to the engine casing forwards of the engine section stator, ESS, 339. The engine section stator is the entry stator vane for the IP compressor in this example and provides a structural function in that it transfers the loads from the inner engine casing 330 to the external structure of the gas turbine engine. Thus, the area immediately radially inwards of the ESS is ideal for carrying loads and is the point to which the bearing chamber support wall 325 is connected. However, the area fore of the ESS connection point is considerably weaker and not designed to carry high levels of load. Although it could be strengthened, this would add weight and complication to the engine. Further, having a secondary load path through the second seal panel through which the bearing chamber could react would make the load distribution more difficult to predict and the engine design unnecessarily challenging.

To avoid these complications, the second seal panel 353 includes a load reduction portion 357 along its radial length such that the component cannot impart any significant radial load to the engine casing, when the second seal panel 353 is subjected to radial loads in excess of a predetermined amount.

The load reduction portion 357 may be provided by an out of plane or offset portion in the panel wall. Thus, as can be seen in the sectional view of FIG. 3, there is a first wall portion 358 which extends from the first static end, the load reduction portion 357, and a second wall portion 359 which extends from the load reduction portion 357 to the second fixed end which attaches to the engine casing fore of the ESS attachment point. The first 358 and second 359 radial wall portions are both in planes normal to the rotational axis of the fans shaft. The planes may be axially separated such that the first and second wall portions are at different axial locations as shown.

The load reduction portion 357 may be provided by a curved portion in the wall which extends axially forwards (or rearwards) to provide circumferential out-of-plane bulge around the front face of the disk-like second seal panel. The curvature may have a constant radius. In other examples the load reduction portion 357 may be provided by one or more curved portions or may be chicane shaped or have a serpentine or meandering section. The radial extent of the load reduction portion 357 may less than a third of the radial length of the second seal panel.

The second seal panel may be made from any suitable material including metals, alloys and composites such as carbon fibre and may be attached by welding or bolting as required.

Figure 4:
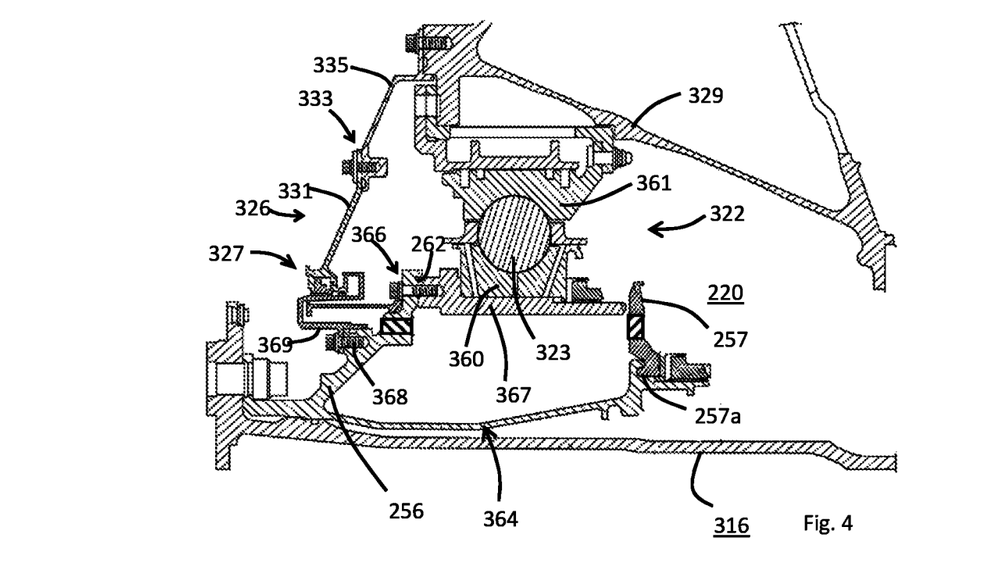
FIG. 4 shows a detailed longitudinal cross-section of the front bearing chamber having fusible joints.

The bearing chamber and shaft support system 314 more generally is shown in more detail in FIG. 4. The shaft support system 314 includes a first support structure in the form of a fore bearing chamber wall 326, a second support structure in the form of a bearing arrangement 322. The bearing chamber wall 326 and bearing arrangement 322 extend in parallel (as opposed to being serially connected) from the shaft 316 to a load bearing structure in the form of the engine casing 330. The first and second support structures provide radial and axial location of the shaft 316 within the engine casing 330 during use, however, it will be appreciated that other components are also required along the shaft.

The first and second support structures include first and second respective mechanical fusible joints which allow the bearing chamber wall 326 and bearing arrangement 322 to collapse in a predetermined way when an extreme event occurs during operation, thereby reconfiguring the support for the shaft 316 and allowing it to move radially outwards into a new, orbiting rotational path.

A fan blade off event is one in which a blade of the fan 320 becomes detached from the rotating fan hub in use. The detachment of the fan blade results in the fan 320 becoming unbalanced with a new centre of mass having an off-centre orbiting rotational path. The collapsible supporting structure allows for the new natural orbiting rotational path of the unbalanced fan shaft 316 to be more readily accommodated, limiting loads and vibrations transferred along primary structure to engine mounts/airframe. The collapsible nature of the support structure is provided by a plurality of fused joints which are designed to collapse over separate ranges of radial loading. This allows the progressive collapse of the support structure which helps dissipate the impacting energy of the unbalanced fan 320. In the context of the present disclosure, this is important because the relocation of the seal panel 312 potentially provides a load path which could interfere with the predetermined collapse of the bearing chamber and should be designed accordingly.

The bearing arrangement 322 may have ball bearings 323 with inner 360 and outer 361 races and a bearing cage 362. It will be appreciated that the disclosure may be applicable to other types of bearing arrangements rather than the ball bearing arrangement of the described embodiment. The outer race 361 is held in a stationary relation to the engine casing 330 by a support wall 325 which is attached to the bearing chamber wall 326. The attachment of the support wall 325 to the bearing chamber 324 may be at any suitable location such as at a radial peripheral edge of the bearing chamber 324. Thus, in the example of FIG. 3, the support wall 325 attaches to the bearing chamber 324 at the junction of the front bearing chamber wall 326, and a lateral wall 329 which extends axially on the radial outside of the bearing and to which the outer race 361 is mounted. The attachment between the bearing chamber 324 and support wall 325 is partially via a flanged union which joins the front bearing chamber wall 326, and an integral connection in which the support wall and lateral wall are integrally joined together to provide a single piece structure.

The inner race 360 attaches to the fan drive shaft 316 via a mounting arrangement which includes a stub shaft 364. The stub shaft 364 is a short shaft which sits radially outside of the fan drive shaft 316 which extends from the fan hub towards turbine (or gearbox as the case may be).

The attachment between the inner race 360 and stub shaft 316 is in the form of a fusible joint 366 provided by an axially facing recessed annular surface at the free end of the flange for abutment with and attachment of a cylindrical sleeve 367 on to which the inner race is mounted. This fused connection is designed to fail during an extreme event such as a fan blade off event as described in more detail below.

A further mounting formation is provided along the length of the stub shaft 364 on the radially outboard surface thereof. This second mounting provides an attachment 368 for the rotating part 369 of the upstream bearing chamber wall 326.

The fore or upstream bearing chamber 326 wall is made from a plurality of segments. The first segment 369 extends from the fan drive shaft via the stub shaft 364 and provides a rotating radially facing platform for the mounting of a seal 327. The stationary part of the seal is carried by the second segment 331 of the bearing chamber wall which is connected, indirectly, to the engine casing and is consequently non-rotating. The second segment 331 of the bearing chamber wall is in the form of a frusto-conical panel which extends from the seal arrangement 327 in a radially outwardly and downstream direction to a bearing chamber wall fused joint 333.

A third segment 335 extends from the bearing chamber fusible joint 333 towards the lateral wall 329 along a similar line as the second segment 331 of the bearing chamber wall 326. The third segment 335 is attached to an outer race support structure via a bolted flange located at the junction of the lateral wall and bearing chamber wall. The second 331 and third segments 335 of the bearing chamber wall have a similar line such that they form a generally conical panel in unison with an axially facing step at which the fusible joint between two segments is located. The length of the respective second 331 and third 335 segment panels is broadly similar such that the fusible joint 333 is located at around the radial and axial mid-point between the seal 327 and joint with the support wall 325.

The separation between the second segment panel 331 and stator seal panel 336 is sufficient enough to allow the fan shaft to orbit in a fan blade off event without contacting one another until all the fused connections have severed. Thus, the bearing chamber wall and seal panel cannot provide a temporary local load path which could interfere with the fuse load paths. It will be appreciated that the specific angles and dimensions of the bearing chamber walls will be particular to the application and the operational requirements for a given engine architecture and as such not elaborated upon further here.

The assembled bearing chamber wall provides a suitable partition to segregate the oil chamber from the surrounding air system. This is completed by the seal 327, and compression seals in the form of o-rings at each of the joints, although other seals may be used. In the described embodiment, the seals 327 are contacting carbon seals, but it will be appreciated that other seals such as labyrinth or brush seals may be used in some instances.

The bearing chamber wall 326 is constructed of suitable materials and dimensions so as to accommodate a portion of the radial load from the low pressure shaft 316 during an extreme event. However, it will be appreciated that the majority of the load is transferred through the bearing arrangement to the engine casing 322. The split of the load and relative dimensions will dependent on many engine specific factors which will be determinable by the skilled person for a particular application.

In the described arrangement, the bearing chamber has two fused connections 366, 333 in the parallel load paths which connect the low pressure shaft 316 to the engine casing 330. In the described embodiment, the first fused connection 333 is in the bearing chamber wall and the second 366 is located between the shaft 316 and the bearing arrangement 322, specifically between the stub shaft and inner race.

The bearing chamber wall is arranged to fail in a two-stage process in which there is a partial break-down or fusing at a first, lower range of radial loading, prior to a complete failing a second, higher and distinct, radial loading.

The first fusible joint is provided by a slip joint in which confronting faces of the two mated components are compressibly clamped together to provide a frictional engagement. The frictional engagement is such that the two components, the first and second segments of the fore bearing chamber wall 326 stay in a fixed relation under normal operating conditions and fail only when a predetermined load threshold is exceeded. As will be appreciated, the load threshold lies within a predetermined range of load which is associated with the radial loads experienced under an extreme event such as a fan blade off. Thus, the predetermined range is calculated from the known properties of the mating of the confronting faces under a particular clamping load, and the radial forces expected in a fan blade off event.

When activated, the slip joint allows the relative radial movement of the two associated panels up to a predetermined amount when loaded within a first load range. When the load increases, it reaches a point where the permissible slip is exhausted and the joint shears. The slip joint is located between the second and third segments of the bearing chamber wall.

The clamping force of the joint is provided by a bolted interface in which the first segment includes a plurality of circumferentially distributed bolt receiving apertures through which the bolts pass. The third bearing chamber wall segment includes a corresponding plurality of circumferentially distributed threaded portions for receiving the bolts. It will be appreciated that the number and relative angular position of the bolts will vary according to the specific architecture of the engine but there may typically be around twenty or thirty evenly distributed around the interface between the two segments. It will also be appreciated that other compressible joints are envisaged to provide the frictional engagement between the confronting faces. For example, the arrangement may be provided with a stud and nut fastener.

To enable the connection to act as a fuse, the bolt receiving aperture is over-sized relative to the bolt shank which is later received. The extent of the over-size is sufficient to allow a predetermined amount relative movement between the first and second segments of the walls when a load threshold is achieved. The amount of movement between the two segments is enough to allow the load path to be transferred to the bearing and second fusible link. The size of the aperture may be between 1.2 to 2 times the width of the bolt shank. In one example, the bolt is 5 mm with the hole being 8 mm.

To ensure that the joint slips in the required manner, the bolt end load is determined and the bolts are torqued by a predetermined amount during assembly. The bolt end load will be dependent on multiple factors which are well understood in the art. Similarly, the corresponding amount of torque may be calculated using methods well known in the art. Such methods consider the contacting area of at the interface of the two panels and a determination of the frictional engagement therebetween. Thus, in use, the bearing chamber wall fuse partially fails by overcoming the frictional engagement between the mating interfaces of the bearing chamber wall segments so as to slip relative to one another and limit the load carrying capacity of the wall. The second stage failure of the first fused joint occurs when the shaft moves enough to overcome the slippage range provided by the oversized hole and loads the bolt until breaking point.

In addition to the bolted union in the slip joint, the first fused connection includes a plurality of pins arranged around the circumferential interface to provide radial and circumferential location. The pins are fewer in number than the bolts. In the described embodiment, there are just three but more could be used if desired.

The stub shaft fused connection is provided by a bolted union between the stub shaft and the cylindrical sleeve which supports the inner race. The stub shaft includes a frusto-conical flange which terminates in a free end having an axially facing annular surface. This axially facing surface provides the mating interface for a corresponding surface of the inner race supporting structure. The free end of the stub shaft flange further includes an axially extending lip which projects from radial extreme of the flange so as to provide a cap like profile in which a recess is provided by the lip. The terminal end of the inner race cylindrical support sleeve is sized so as to be snugly received within the lipped recess of the stub shaft flange.

In use, the fan drive shaft 316 and stub shaft 364 are held on the central and principal axis of rotation in the engine. During normal operation, radial loads from the fan drive shaft 316 are carried through the bearing chamber support structure to the ESS and to the external supporting structure of the engine, ultimately to the wing of the aircraft. In doing so, the second seal panel deforms and flexes to reduce the load being transferred through it.

In the event of a fan blade off incident and the unbalancing of the fan 320, the shaft 316 undergoes a sudden radial loading away from the lost fan blade. Thus, with reference to FIGS. 3 and 4, if a fan blade was lost at the bottom centre of the engine, the fan shaft would move upwards such that the seal panel 312 and the first and second load paths of the bearing chamber and their respective fused joints 333, 366, 341 become asymmetrically loaded around the engine.

The radial load increases until a first load threshold is achieved within a predetermined range and the seal panel 312 is overloaded and collapses, either by a failure of the joint 341 by severing the bolts (and pins), or by deformation of the seal panel. With the seal panel disabled, the radial load may be distributed predominantly through the bearing chamber support causing the fused joint 333 to slip. In the case where the joint is severed, the stator and rotor parts of the seal panel are severed and the two are free to move relative to one another, noting the rotor may be restricted by other means such as the fused joints. That is, there is no load path between the rotor and stator through the seal panel once the joint has failed.

It will be appreciated that the predetermined force which causes the breakdown of the seal panel may be less than the first predetermined force which causes the fused joint to slip.

When a second radial load threshold is reached, some of the bolts which provide the bearing fuse 366 which axially retain the stub shaft 364 and inner race sleeve 367 together elongate such that the stub shaft 367 and inner race sleeve 367 begin to axially separate. The axial separation continues to a point in which the sleeve is no longer retained by the joint. Once released, the remaining bolts fail under shear loading until the two components are axially and radially separated.

Once separated, the shaft 316 is free to move in a radial direction once more and the load path may be redistributed to the bearing chamber wall 326 to exhaust the slip range which is afforded by the over-sized holes. The second stage failure of the bearing chamber wall is achieved with the shearing of the fused joint bolts. Once this occurs, the first and second bearing chamber wall segments radially pass one another as the shaft 316 and stub shaft 367 move radially towards the inner race support until contact is made.

The radial offset between the inner race support structure and the stub shaft 367 is sufficient to accommodate the off-centre orbital path of the unbalanced fan shaft. Thus, when collapsed, the structure allows the shaft 316 to orbit around the bearing chamber 320, thus accommodating the new centre of mass of the fan.

The collapse of the support structure system needs to account for the new orbiting path of the unbalanced fan assembly. As will be appreciated, the radial forces and associated orbiting path will be affected by the weight of the various components and the rotational speed at which a failure can be expected. Once the expected radial forces and movement are known the requirements from the various supporting components and necessary movement can be calculated using techniques known in the art.

The predetermined load ranges for each of the support structures needs to be calculated to allow for the distinct failure mechanisms to work in concert so as to provide the staged collapse. Thus, the first load range covers the expected threshold of loading which is required to provide the necessary movement in the slip joint. In doing so, a calculation is made as to the expected force which is required to overcome the frictional engagement and pin location of the slip joint.

In the described embodiment, the initial failure of the first fused connection 333 which is attributable to the slip, is achieved at between 20 and 100 kN. The structural collapse of the seal panel may be lower than this first slip threshold. The failure of the second fused joint 366, is between 800 kN and 1.2 MN but may be narrower and further removed from the other predetermined ranges. For example, the second range may be between 900 kN and 1.1 MN. The total failure of the first joint is within the range 300 kN and 500 kN, but again this may be different depending on the ranges of the other fuses and the expected radial forces for a particular fan. It will be appreciated that the failure of the second fused connection is greater than the total failure of the first fused connection which is potentially counter-intuitive. This is because the failure of the second fused connection allows the fan assembly and shaft to move slightly which until the slip is exhausted. At this point the radial load will increase further until the first fused connection fully fails.

It will be appreciated that the order in which the various joints fail may be different in some circumstances, both in design and operation. Thus, it is possible that the bearing chamber wall fused joint 333 slips and fails prior to the bearing fused joint 366, rather than 333 partially and fully failing either side of the second fused joint failing.

Although the described example includes the fused bearing chamber, this need not be the case. The seal panel may be provided in an engine which does not have or has an alternative collapsible support structure. In such a case, the seal panel may or may not have the fused joint.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The above described embodiments are provided as examples only and should not be taken as limitations of the broader inventive concept as defined by the scope of the appended claims. Except where mutually exclusive, any of the features may be employed separately or in combination with any other features and the disclosure extends to and includes all combinations and sub-combinations of one or more features described herein.

The invention claimed is:

1. A gas turbine engine, comprising:
   a fan;
   a fan drive shaft driveably connected to the fan;
   a bearing chamber located axially aft of the fan and including a bearing for rotational support of the fan drive shaft and a fused joint configured to sever under a first predetermined radial load;
   a seal panel located axially between the fan and the bearing chamber, the seal panel extending between the fan drive shaft and a static structure and comprising a rotor portion and a stator portion; the rotor portion comprising a cantilever having an attached end attached to the fan drive shaft, and a free end; and
   a seal partitioning the rotor portion and stator portion of the seal panel, the seal having respective rotating parts and a stationary parts and wherein the rotating part of the seal is mounted to the free end of the rotor portion cantilever;
   wherein in either or both of the rotor portion or stator portion of the seal panel include a seal panel joint configured to sever upon a second predetermined radial load, and wherein the first predetermined radial load of the bearing chamber fused joint is greater than the second predetermined load of the seal panel joint.

2. A gas turbine engine as claimed in claim 1, wherein the stator portion of the seal panel comprises a cantilevered wall extending from an attached end which is attached to a static structure and a free end to which the stationary part of the seal is mounted.

3. A gas turbine engine as claimed in claim 2, wherein the stator portion cantilever includes a conical portion.

4. A gas turbine engine as claimed in claim 1, wherein the seal panel is attached to the bearing chamber.

5. A gas turbine engine as claimed in claim 4, further comprising a second seal panel extending between the bearing chamber and an engine casing.

6. A gas turbine engine as claimed in claim 5, wherein the seal panel and the second seal panel are attached to the bearing chamber at a common node.

7. A gas turbine engine as claimed in claim 5, wherein the seal panel and the bearing chamber form part of a first chamber and the second seal panel and bearing chamber form part of a second chamber, and wherein the first and second sealed chambers are fluidically connected.

8. A gas turbine engine as claimed in claim 5, wherein the second seal panel includes a load reduction portion which is provided to allow the seal panel to deform under a predetermined radial load.

9. A gas turbine engine as claimed in claim 1, wherein the rotor portion cantilever lies in a radial plane normal to a rotational axis of the fan drive shaft.

10. A gas turbine engine as claimed in claim 1, wherein the second seal panel is a disc-like structure and load reduction portion is offset so as to be out-of-plane from the disc-like structure.

11. A gas turbine engine as claimed in claim 10, wherein the second seal panel is located in two parallel planes, and an undulation of the load reduction portion bridges the two parallel planes.

12. A gas turbine engine as claimed in claim 1, wherein the stator portion further comprises an annular seal plate having an axially extending part with a radially inwards facing seal surface which sealably opposes the rotating seal part.

13. A gas turbine engine as claimed in claim 1, wherein the bearing chamber has fore and aft bearing chamber walls.

* * * * *